United States Patent
Di-Gianni et al.

(10) Patent No.: US 10,818,407 B2
(45) Date of Patent: Oct. 27, 2020

(54) APPARATUS FOR THE GENERATION, DISTRIBUTION AND/OR USAGE OF ELECTRICAL ENERGY AND COMPONENT FOR SUCH AN APPARATUS

(71) Applicant: ABB Schweiz AG, Baden (CH)

(72) Inventors: Anna Di-Gianni, Dättwil (CH); Malena Bergsblom, Enköping (SE); Thomas Alfred Paul, Wädenswil (CH); Javier Mantilla Florez, Baden (CH); Mathias-Dominic Buergler, Wettingen (CH); Oliver Cossalter, Fislisbach (CH); Stephan Grob, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/619,916

(22) Filed: Jun. 12, 2017

(65) Prior Publication Data

US 2017/0287588 A1    Oct. 5, 2017

Related U.S. Application Data

(63) Continuation of application No. PCT/EP2015/079613, filed on Dec. 14, 2015.

(30) Foreign Application Priority Data

Dec. 12, 2014    (WO) ................ PCT/EP2014/003345

(51) Int. Cl.
  *H01B 3/24*    (2006.01)
  *H01B 3/56*    (2006.01)
  (Continued)

(52) U.S. Cl.
  CPC ................ *H01B 3/24* (2013.01); *H01B 3/40* (2013.01); *H01B 3/56* (2013.01); *H01B 19/04* (2013.01); *H02B 7/01* (2013.01); *H01H 33/56* (2013.01)

(58) Field of Classification Search
  CPC . H01B 19/04; H01B 3/24; H01B 3/56; H01B 3/40; H02B 7/01; H01H 33/56
  (Continued)

(56) References Cited

U.S. PATENT DOCUMENTS 3,059,044 A * 10/1962 Friedrich ............... H01B 17/36
  174/12 BH
3,828,000 A * 8/1974 Luck ..................... C08G 59/24
  428/36.4

(Continued)

FOREIGN PATENT DOCUMENTS

CA    2821218 A1    6/2012
EP    0588359 A2    3/1994
(Continued)

OTHER PUBLICATIONS

European Patent Office, International Search Report and Written Opinion issued in corresponding Application No. PCT/EP2015/079613, dated Mar. 22, 2016, 11 pp.

(Continued)

*Primary Examiner* — Anatoly Vortman
(74) *Attorney, Agent, or Firm* — Taft Stettinius & Hollister LLP; J. Bruce Schelkopf (57) ABSTRACT

The present invention relates to an electrical apparatus having an insulating space which contains a dielectric insulation fluid comprising an organofluorine compound. At least one solid component of the apparatus that is directly exposed to the insulation fluid contains a basic body made of a first material and a protective layer made of a second material different from the first material, the protective layer being directly or indirectly applied on the basic body and having a thickness of at least 50 μm. The organofluorine compound is selected from the group consisting of: fluoroethers, fluoroketones, fluoroolefins, fluoronitriles, and mixtures thereof, and the first material comprises or consists (Continued)

of a material selected from the group consisting of: a polymeric material, a ceramic, a composite material, and mixtures or combinations thereof.

29 Claims, 3 Drawing Sheets

(51) Int. Cl.
*H02B 7/01* (2006.01)
*H01B 3/40* (2006.01)
*H01B 19/04* (2006.01)
*H01H 33/56* (2006.01)

(58) Field of Classification Search
USPC .......................................................... 361/618
See application file for complete search history.

(56) References Cited

U.S. PATENT DOCUMENTS

| | | | | |
|---|---|---|---|---|
| 4,102,851 | A * | 7/1978 | Luck ..................... | C08G 59/42 252/571 |
| 6,426,150 | B1 * | 7/2002 | Jenkner .................. | H01B 19/04 174/137 A |
| 2012/0083568 | A1 * | 4/2012 | Soucek ................ | C09D 163/00 524/544 |
| 2013/0277438 | A1 * | 10/2013 | Terwiesch .............. | G05D 16/20 236/1 E |
| 2014/0291292 | A1 * | 10/2014 | Pisu ....................... | H01H 33/22 218/52 |
| 2014/0346143 | A1 * | 11/2014 | Miyamoto ........... | C09D 163/00 218/1 |
| 2015/0206621 | A1 * | 7/2015 | Mahdizadeh ............ | H01B 3/40 174/137 B |
| 2015/0214701 | A1 * | 7/2015 | Paul ......................... | H01B 3/56 361/618 |
| 2016/0225486 | A1 * | 8/2016 | Di-Gianni ................ | H01B 3/56 |

FOREIGN PATENT DOCUMENTS

| | | | |
|---|---|---|---|
| EP | 0588359 A3 | 3/1994 | |
| WO | 2004094526 A1 | 11/2004 | |
| WO | 2010142346 A1 | 12/2010 | |
| WO | 2012080246 A1 | 6/2012 | |
| WO | 2012080269 A1 | 6/2012 | |
| WO | 2013064410 A1 | 5/2013 | |
| WO | WO-2013121604 A1 * | 8/2013 | ........... C09D 163/00 |
| WO | 2014037030 A1 | 3/2014 | |
| WO | 2014037395 A1 | 3/2014 | |
| WO | 2014037396 A1 | 3/2014 | |
| WO | 2014037566 A1 | 3/2014 | |
| WO | 2014053462 A1 | 4/2014 | |
| WO | 2014053661 A1 | 4/2014 | |

OTHER PUBLICATIONS

European Patent Office, International Preliminary Report on Patentability issued in corresponding Application No. PCT/EP2015/079613, dated Feb. 27, 2017, 20 pp.

European Patent Office, International Search Report and Written Opinion issued in corresponding Application No. PCT/EP2014/003345, dated Apr. 29, 2015, 13 pp.

* cited by examiner

APPARATUS FOR THE GENERATION, DISTRIBUTION AND/OR USAGE OF ELECTRICAL ENERGY AND COMPONENT FOR SUCH AN APPARATUS

BACKGROUND

The present invention relates to an apparatus for the generation, transmission, distribution and/or usage of electrical energy, to a component for such an apparatus, and to a process for the preparation of such a component.

Dielectric insulation media in liquid or gaseous state are conventionally applied for the insulation of an electrically conductive part in a wide variety of apparatuses, such as for example switchgears, gas-insulated substations (GIS), gas-insulated lines (GIL), transformers, or others.

In medium or high voltage metal-encapsulated switchgears, for example, the electrically conductive part is arranged in a gas-tight housing, which defines an insulating space, said insulation space comprising an insulation gas and separating the housing from the electrically conductive part without letting electrical current to pass through the insulation space. For interrupting the current in e.g. high voltage switchgears, the insulating gas further functions as an arc extinction gas.

Recently, the use of organofluorine compounds in a dielectric insulation gas has been suggested. Specifically, WO-A-2010/142346 discloses a dielectric insulation medium comprising a fluoroketone containing from 4 to 12 carbon atoms. Further, WO-A-2012/080246 discloses a fluoroketone containing exactly 5 carbon atoms (hereinafter referred to as "C5K") in a mixture with a dielectric insulation gas component different from said C5K to be particularly preferred.

Fluoroketones have been shown to have high insulation capabilities, in particular a high dielectric strength, as well as high arc extinction capabilities. At the same time, they have a very low Global Warming Potential (GWP) and very low toxicity. The combination of these characteristics renders these fluoroketones highly suitable as a possible alternative to conventional insulation gases.

SUMMARY

Notwithstanding the above-mentioned excellent properties of a fluoroketone-containing insulation gas, it has unexpectedly been found that care must be taken to avoid a reduction in their insulation and arc extinction performance over prolonged operation times. Otherwise, a situation could ultimately occur that maintenance intervals were shortened or that operation of the apparatus should prematurely be interrupted in order to replace at least a portion of the insulation gas.

In addition, it has unexpectedly been found that also care should be taken to avoid that the functionality of components of the apparatus, which are directly exposed to the fluoro-ketone-containing insulation gas, could adversely be affected during exposure over prolonged operation times. This could ultimately likewise lead to the situation mentioned above, that maintenance intervals were shortened or that operation of the apparatus should prematurely be interrupted, in this case for replacement of the respective component. For example, sealing components made of a polymeric material available on the market have surprisingly been found to be sensitive to C5K exposure at operational conditions.

The above findings regarding the potential reduction in performance of the insulation gas and in functionality of certain components are contrary to the general assumption that fluoroketones are non-reactive at operational conditions of the apparatus. This general assumption is reflected by the fact that there is nothing in the published state of art reporting on potential instability and incompatibility issues that might arise when using fluoroketones in general and C5K in specific. Yet unpublished international patent application No. PCT/EP2014/071274 of the same applicant relates to an apparatus of which at least some of the components of the apparatus that are directly exposed to the insulation gas are made of a material which remains unaltered during exposure to the insulation gas.

WO 2014/037566 A1 discloses a medium- or high-voltage apparatus having a dielectric insulation gas comprising heptafluoro-isobutyronitrile in a mixture with a dilution gas and having electrical conductors or electrodes being covered with a solid dielectric layer of variable thickness.

The choice of a specific material for a specific component of an apparatus is the result of a long and often burdensome development process. A material showing optimal performance for an $SF_6$ insulated apparatus does not necessarily have to be compatible for an apparatus using a non-$SF_6$ gas for dielectric insulation. However, replacement of the $SF_6$-compatible material by another material often goes along with a decrease in desired properties or performance other than the compatibility with the insulation fluid. This can lead to the situation that the technical requirements are not matched or are harder to be matched.

In consideration of the above, the problem to be solved by the present invention is thus to provide an apparatus for the generation, transmission, distribution and/or usage of electrical energy, said apparatus comprising a dielectric insulation fluid containing an organofluorine compound and fully complying with the technical requirements on its components while at the same time maintaining a high integrity of the insulation fluid and the components even after prolonged exposure of the components to the insulation fluid. In particular, the present invention shall allow the components of the apparatus to maintain the mechanical and electrical properties of a component of an $SF_6$-insulated apparatus and at the same time be compatible with the insulation fluid comprising the organofluorine compound.

The problem is solved by the disclosed subject matter. Preferred embodiments of the invention are described below.

The invention relates to an apparatus for the generation, transmission, distribution and/or usage of electrical energy. As further defined below, the apparatus comprises a housing enclosing an insulating space and an electrically conductive part arranged in the insulating space, said insulating space containing a dielectric insulation fluid comprising an organofluorine compound, with at least one solid component of the apparatus being directly exposed to the insulation fluid.

According to the invention, the at least one solid component that is directly exposed to the insulation fluid contains a basic body made of a first material and a protective layer made of a second material different from the first material, said protective layer being directly or indirectly applied on the basic body and having a thickness of at least 50 μm.

The present invention thus allows using a component material well-established for use in an $SF_6$ insulated apparatus also in an apparatus using an insulation fluid containing an organofluorine compound, irrespective of a potential incompatibility of the component material with the organofluorine compound. Thus, the burdensome development of a fully organofluorine-compatible material which matches all the other technical requirements is obviated by the present invention.

This is achieved by the protective layer, which prevents the basic body of the solid component from coming into direct contact with the insulation fluid, and in particular with the organofluorine compound comprised in the insulation fluid.

In other words, the present invention allows shielding the basic body from reaction with the insulation fluid, in particular organfluorine compound, which might have an impact on both the integrity of the insulation fluid as well as of the solid component.

Ultimately, the functionality of the components is maintained and there is thus no need for regular replacement of the components, ultimately allowing for a long service lifetime and a low maintenance of the apparatus.

Further, decomposition reactions with the organofluorine compound, such as a nucleophilic substitution of the fluoroketone's carbonyl group or of the fluoronitrile's nitrile group, are efficiently prevented and the integrity of the insulation gas and thus also its insulation and arc extinction performance is maintained, which further contributes to a long service lifetime and a low maintenance of the apparatus.

In addition, safety or health risks that may be caused by decomposition products are according to this aspect of the present invention reduced or even eliminated. This is of particular relevance in the case where one potential decomposition product is hydrogen fluoride (HF), which is highly corrosive and extremely toxic.

The relevance of decomposition products being reduced or eliminated is further emphasized by the fact that some decomposition products might open reaction pathways which are closed for the organofluorine compound on which they are based. This is for example the case for copper which has the potential to react with a decomposition product of C5K, but not with C5K itself. Such secondary reactions are efficiently reduced or even eliminated by the present invention.

The term "solid component" is to be understood broadly and shall encompass any solid part having a surface which is at least partially or at least during a certain time period exposed to the insulation fluid. In particular, the term "solid components" includes any part or portion of the housing wall being in contact with the insulation fluid. Also, sealing components, in particular sealing rings and the like, are encompassed by the term "solid component".

The term "solid component" particularly relates to a solid component comprising or consisting of polyamide or a polyamide composite, to a component containing alkaline or alkaline earth cations, e.g. to a fiber reinforced composite and/or to an elastomer, e.g. containing MgO or CaO as a filler, since for these materials incompatibility issues are of particularly relevance and the effect achieved according to the present invention is thus particularly pronounced.

The term "at least one of the components" as used in the context of the present invention can relate to only one of the components, two or more of the components, and/or all components that are directly exposed to, i.e. are in direct contact with, the insulation fluid.

According to the present invention, the first material, i.e. the material of the basic body of the at least one solid component, comprises or consists of a material selected from the group consisting of: a polymeric material, a ceramic, a composite material, and mixtures or combinations thereof. In particular, the material is a polymeric material, more particularly a thermoplastic, or a composite including a polymeric material. Also with regard to this embodiment, the basic body of only one of the components, two or more of the components, and/or all components can comprise or consist of the material mentioned above.

In particular, the first material of the basic body is a non-conducting material or dielectric material or electrically insulating material. Further in particular, the protective cover or its first material, respectively, form non-self-supporting structures. In other words, only the solid component or its basic body together with the protective cover form a self-supporting structure in the apparatus.

For example, the solid component of the apparatus containing the basic body or the basic body itself is or are a solid insulator or post insulator or compartment insulator or GIS insulator, in particular arranged or for being arranged in a medium-voltage GIS or high-voltage GIS, or GIL insulator or transformer insulator for a gas-insulator transformer, or solid insulation in a gas-insulated cable. In particular in this case, the protective layer is made of a dielectric material or semiconductive material or slightly conducting material, or forms a multi-layer containing a combination of such materials. According to the present invention, this insulator or its basic body, respectively, has the protective cover on its face(s) oriented towards the dielectric fluid containing the organofluorine compound, and the protective cover protects against prevents chemical reactions to occur between the solid component or its basic body and the organofluorine compound(s) and degradation products thereof present in the dielectric insulation fluid. This prolongs the integrity or lifetime of both the dielectric insulation fluid and of the solid component or its basic body.

As another example, the solid component of the apparatus containing the basic body or the basic body itself is or are a sealing component of the apparatus. In particular in this case, the protective layer is made of semiconductive material or slightly conducting material or metallic material, or forms a multi-layer containing a combination of such materials.

As mentioned above, the first material can specifically be a material which has proven to be particularly suitable in a conventional apparatus, more specifically an $SF_6$-insulated apparatus, irrespective of its potential incompatibility with an organofluorine compound-containing insulation fluid.

In embodiments, the second material is a dielectric material. According to specific embodiments, the second material comprises or consists of a polymeric material selected from the group consisting of: epoxy resins, polyolefins, particularly hydrogenated polyolefins or fluorinated polyolefins and more particularly polytetrafluoroethylene, polyurethanes, and mixtures thereof. It has been found that these materials exhibit high compatibility with organofluorine compounds, in particular with fluoroketones or fluoronitriles, and further prevent gas permeation of the organofluorine compound.

Among the polymeric materials mentioned, epoxy resins have turned out to be particularly preferred. This is not only owed to their high compatibility, but also to the fact that high crosslinking densities can be achieved for epoxy resins, ensuring low gas permeation through the protective layer. Thus, the organofluorine compound, and in particular the fluoroketone or fluoronitrile, is prevented from passing through the protective layer and thus from contacting the basic body, even in the case that the protective layer is relatively thin. As further advantage, epoxy resins allow for achieving relatively high glass-transition temperatures, which makes these materials also suitable for apparatuses in which relatively high temperatures are generated, specifically switching apparatuses. In particular, the high glass-transition temperature contributes to a low gas permeation through the protective layer also at high temperatures.

According to a specific embodiment, the solid component has in use of the apparatus a first side exposed to or oriented towards the insulation fluid and a second side remote from the first side and not being exposed to or being averted from the insulation fluid. In this embodiment, the protective layer is preferably applied on the side of the basic body facing the first side of the solid component, and more preferably is applied on this side only; thus, in particular, direct contact between the basic body and the insulation fluid is prevented. In this context, the term "remote from the first side" is specifically to be interpreted as relating to the far side with respect to the first side. Thus, the use of the polymeric material can be limited to the areas where it is actually needed. The characteristics of the material of the solid component is therefore only affected by the protective layer to the least necessary and only to the degree of protecting the basic body from reacting with the insulation fluid.

It is further preferred that on the side remote from the basic body the surface of the protective layer is directly exposed to the insulation fluid. In this context, the term "remote from the basic body" relates to the far side of the protective layer with respect to the basic body.

Since according to a further preferred embodiment, the reactivity of the second material towards the organofluorine compound is lower than the one of the first material at operational conditions of the apparatus, degradation of both the organofluorine compound as well as of the solid component can be decreased or can even be eliminated.

According to a particularly preferred embodiment, the second material is inert towards the organofluorine compound or any degradation product thereof at operational conditions of the apparatus, meaning that it has no reactivity towards these components at all at operational conditions of the apparatus.

It is further preferred that the second material is constituted such that it remains unaltered during exposure to the insulation fluid for a period of more than 1 year, in particular of more than 3 years or 5 years or 10 or 20 years, at operational conditions of the apparatus. Most preferably, neither the solid component nor the organofluorine compound is subject to degradation for at least one year, in particular for at least 3 years or 5 years or 10 or 20 years.

According to the invention, the organofluorine compound is selected from the group consisting of: fluoroethers, in particular hydrofluoroethers, e.g. hydrofluoromonoethers, or perfluoroethers, fluoroketones, in particular perfluoroketones, fluoroolefins, in particular hydrofluoroolefins, and fluoronitriles, in particular perfluoronitriles, and mixtures thereof.

It is thereby particularly preferred that the insulation fluid comprises a fluoroketone containing from four to twelve carbon atoms, preferably containing exactly five carbon atoms or exactly six carbon atoms or mixtures thereof. The advantages achieved by the present invention are particularly pronounced when the insulation fluid comprises a fluoroketone as defined above, since any problem, which might otherwise arise from the ketone group being subject to nucleophilic substitution, can be avoided.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds between carbon atoms. The at least partially fluorinated alkyl chain of the fluoroketones can be linear or branched, or can form a ring, which optionally is substituted by one or more alkyl groups. In exemplary embodiments, the fluoroketone is a perfluoroketone. In further exemplary embodiment, the fluoroketone has a branched alkyl chain, in particular an at least partially fluorinated alkyl chain. In still further exemplary embodiments, the fluoroketone is a fully saturated compound.

As mentioned, it is particularly preferred that the insulation fluid comprises a fluoroketone containing exactly five carbon atoms or exactly six carbon atoms or mixtures thereof. Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

According to embodiments, the fluoroketone is at least one compound selected from the group consisting of the compounds defined by the following structural formulae in which at least one hydrogen atom is substituted with a fluorine atom:

(Ia)

(Ib)

(Ic)

(Id)

(Ie)

(If)

(Ig)

(Ih)

Fluoroketones containing five or more carbon atoms are further advantageous, because they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms, herein briefly named C5K, and fluoroketones containing exactly six carbon atoms are thermally stable up to 500° C.

In embodiments of this invention, the fluoroketones, in particular C5K, having a branched alkyl chain are preferred, because their boiling points are lower than the boiling points of the corresponding compounds (i.e. compounds with same molecular formula) having a straight alkyl chain.

According to embodiments, the C5K is a perfluoroketone, in particular has the molecular formula $C_5F_{10}O$, i.e. is fully saturated without double or triple bonds between carbon atoms. The fluoroketone C5K may more preferably be selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one, 1,1,1,2,2,4,4,5,5,5-decafluoropentan-3-one and octafluoro-cylcopentanone, and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

(I)

1,1,1,3,4,4,4-heptafluoro-3-(trifluoromethyl)butan-2-one with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with a dielectric carrier gas, has very low GWP and has a low boiling point. It has an ODP of 0 and is practically non-toxic.

According to embodiments, even higher insulation capabilities can be achieved by combining the mixture of different fluoroketone components. In embodiments, a fluoroketone containing exactly five carbon atoms, as described above and here briefly called C5K, and a fluoroketone containing exactly six carbon atoms or exactly seven carbon atoms, here briefly named fluoroketone C6K or C7K, can favourably be part of the dielectric insulation at the same time. Thus, an insulation fluid can be achieved having more than one fluoroketone, each contributing by itself to the dielectric strength of the insulation fluid.

In embodiments, the further fluoroketone C6K or C7K is at least one compound selected from the group consisting of the compounds defined by the following structural formulae in which at least one hydrogen atom is substituted with a fluorine atom:

(IIa)

(IIb)

(IIc)

(IId)

(IIe)

(IIf)

, and

(IIg)

as well as any fluoroketone having exactly 6 carbon atoms, in which the at least partially fluorinated alkyl chain of the fluoroketone forms a ring, which is substituted by one or more alkyl groups (IIh);

and/or is at least one compound selected from the group consisting of the compounds defined by the following structural formulae in which at least one hydrogen atom is substituted with a fluorine atom:

(IIIa)

(IIIb)

(IIIc)

-continued

(IIId)

(IIIe)

(IIIf)

(IIIg)

(IIIh)

(IIIi)

(IIIj)

(IIIk)

(IIIl)

(IIIm)

, and (IIIn)

e.g. dodecafluoro-cycloheptanone, as well as any fluoroketone having exactly 7 carbon atoms, in which the at least partially fluorinated alkyl chain of the fluoroketone forms a ring, which is substituted by one or more alkyl groups (IIIo).

The present invention encompasses each compound or each combination of compounds selected from the group consisting of the compounds according to structural formulae (Ia) to (Ii), (IIa) to (IIh), (IIIa) to (IIIo), and mixtures thereof.

Depending on the specific application of the apparatus of the present invention, a fluoroketone containing exactly six carbon atoms (falling under the designation "C6K" mentioned above) may be preferred; such a fluoroketone is non-toxic, with outstanding margins for human safety.

In embodiments, fluoroketone C6K, alike C5K, is a perfluoroketone, and/or has a branched alkyl chain, in particular an at least partially fluorinated alkyl chain, and/or the fluoroketone C6K contains fully saturated compounds. In particular, the fluoroketone C6K has the molecular formula $C_6F_{12}O$, i.e. is fully saturated without double or triple bonds between carbon atoms. More preferably, the fluoroketone C6K can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis-(trifluoromethyl)butan-2-one (also named dodecafluoro-3,3-(dimethyl)butan-2-one), dodecafluorohexan-2-one, dodecafluorohexan-3-one, and particularly is the mentioned 1,1,1,2,4,4,5,5,5-nonafluoro-2-(trifluoromethyl) pentan-3-one; or it can be decafluorocyclohexanone with molecular formula $C_6F_{10}O$.

1,1,1,2,4,4,5,5,5-Nonafluoro-2-(trifluoromethyl)pentan-3-one (also named dodecafluoro-2-methylpentan-3-one) can be represented by the following structural formula (II):

(II)

1,1,1,2,4,4,5,5,5-Nonafluoro-4-(trifluoromethyl)pentan-3-one (here briefly called "C6-ketone", with molecular formula $C_2F_5C(O)CF(CF_3)_2$) has been found to be particularly preferred for high voltage insulation applications because of its high insulating properties and its extremely low GWP. Specifically, its pressure-reduced breakdown field strength is around 240 kV/(cm*bar), which is much higher than the one of air having a much lower dielectric strength ($E_{cr}$=25 kV/(cm*bar). It has an ozone depletion potential of 0 and is non-toxic (LC50 of about 100,000 ppm). Thus, the environmental impact is very low, and at the same time outstanding margins for human safety are achieved.

Additionally or alternatively, the insulation fluid preferably comprises a hydrofluoromonoether containing at least three carbon atoms.

As mentioned above, the organofluorine compound can also be a fluoroolefin, in particular a hydrofluoroolefin. More particularly, the fluoroolefin or hydrofluoroolefin, respectively, contains exactly three carbon atoms.

According to specific embodiments, the hydrofluoroolefin is thus selected from the group consisting of: 1,1,1,2-tetrafluoropropene (HFO-1234yf), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3- pentafluoropropene (HFO-1225yc), 1,1,1,3,3-pentafluoropropene (HFO-1225zc), (Z)1,1,1,3-tetrafluoropropene (HFO-1234zeZ), (Z)1,1,2,3-tetrafluoro-2-propene (HFO-1234yeZ), (E)1,1,1,3-tetrafluoropropene (HFO-1234zeE), (E)1,1,2,3-tetrafluoro-2-propene (HFO-1234yeE), (Z)1,1,1,2,3-pentafluoropropene (HFO-1225yeZ), (E)1,1,1,2,3-pentafluoropropene (HFO-1225yeE), and combinations thereof.

As mentioned above, the organofluorine compound can also be a fluoronitrile, in particular a perfluoronitrile. In particular, the organofluorine compound can be a fluoronitrile, specifically a perfluoronitrile, containing two carbon atoms, three carbon atoms or four carbon atoms.

More particularly, the fluoronitrile can be a perfluoroalkylnitrile, specifically perfluoroacetonitrile, perfluoro-propionitrile ($C_2F_5CN$) and/or perfluorobutyronitrile ($C_3F_7CN$).

Most particularly, the fluoronitrile can be perfluoroisobutyronitrile (according to the formula $(CF_3)_2CFCN$) and/or perfluoro-2-methoxypropanenitrile (according to the formula $CF_3CF(OCF_3)CN$). Of these, perfluoroisobutyronitrile is particularly preferred due to its low toxicity.

According to a further preferred embodiment, the insulation fluid comprises carbon dioxide ($CO_2$). Additionally or alternatively, the insulation fluid comprises air or at least one air component, in particular selected from the group consisting of oxygen ($O_2$), nitrogen ($N_2$), carbon dioxide ($CO_2$), and mixtures thereof.

According to specific embodiments, the insulation fluid comprises carbon dioxide in a mixture with oxygen. It is thereby preferred that the ratio of the amount of carbon dioxide to the amount of oxygen ranges from 50:50 to 100:1.

In particular in view of interrupting the current in a high voltage switchgear, it is further preferred that the ratio of the amount of carbon dioxide to the amount of oxygen ranges from 80:20 to 95:5, more preferably from 85:15 to 92:8, even more preferably from 87:13 to less than 90:10, and in particular is about 89:11. In this regard, it has been found on the one hand that oxygen being present in a molar fraction of at least 5% allows soot formation to be prevented even after repeated current interruption events with high current arcing. On the other hand, oxygen being present in a molar fraction of at most 20% (i.e. of 20% or less), more particularly of at most 15% (i.e. of 15% or less), reduces the risk of degradation of the material of the electrical apparatus by oxidation.

The term "apparatus" or "electrical apparatus" as used in the context of the present invention specifically relates to a gas-insulated apparatus. In particular, it is part of or is a: high voltage apparatus, medium voltage apparatus, low voltage apparatus, direct-current apparatus, switchgear, air-insulated switchgear, part or component of air-insulated switchgear, gas-insulated metal-encapsulated switchgear (GIS), part or component of gas-insulated metal-encapsulated switchgear, gas-insulated transmission line (GIL), busbar, bushing, gas-insulated cable, cable joint, current transformer, voltage transformer, sensors, humidity sensors, surge arrester, capacitor, inductance, resistor, current limiter, high voltage switch, earthing switch, disconnector, combined disconnector and earthing switch, load-break switch, circuit breaker, gas circuit breaker, gas-insulated vacuum circuit breaker, generator circuit breaker, medium voltage switch, ring main unit, recloser, sectionalizer, low voltage switch, any type of gas-insulated switch, transformer, distribution transformer, power transformer, tap changer, transformer bushing, electrical rotating machine, generator, motor, drive, semiconducting device, power semiconductor device, power converter, converter station, convertor building; and components and/or combinations of such devices.

Besides the apparatus described above, the present invention also relates to a solid component for such an apparatus, at least a portion of the surface of the component being to be directly exposed to an insulation fluid comprising an organofluorine compound. In analogy to what is described above, the solid component contains a basic body made of a first material and a protective layer made of a second material and being directly or indirectly applied on the basic body, the second material being different from the first material and the protective layer having a thickness of at least 50 µm.

Thus, a solid component with reduced reactivity or no reactivity at all towards the organofluorine compound can be provided, which at the same complies with the technical requirements of the solid component inside the apparatus. Since for the basic body, a material well-established for use in an $SF_6$-insulated apparatus can be chosen, the burdensome development of a fully organofluorine-compatible material which matches all the other technical requirements can be obviated.

The preferred features described above for the apparatus of the present invention likewise are disclosed for the solid component and vice versa. In particular, the basic body of at least some of the solid components comprises or consists of a polymeric material, a ceramic, a composite material, in particular an insulating composite material, and mixtures or combinations thereof.

In further analogy to what is described above for the apparatus of the invention, the second material preferably comprises or consists of a polymeric material selected from the group consisting of: epoxy resins, polyolefins, particularly hydrogenated polyolefins or fluorinated polyolefins and more particularly polytetrafluoroethylene, polyurethanes, and mixtures thereof.

According to specific embodiments of the solid component and hence of the apparatus, the protective layer has a thickness of at least 100 µm, preferably at least 200 µm, more preferably at least 300 µm, and most preferably at least 500 µm. Thus, a low gas permeation through the protective layer can be ensured. Thereby, it is further preferred that the protective layer has a thickness in the range from 50 µm to 100 mm, preferably from 200 µm to 50 mm, more preferably from 300 µm to 10 mm, and most preferably from 500 µm to 5 mm, providing for a low gas permeation but at the same time keeping the amount of protective layer to a minimum.

In embodiments, in view of a high temperature resistivity to be achieved, the polymeric material of the protective layer, in particular the epoxy resin, has a glass transition temperature higher than 100° C. As mentioned, this contributes in particular to a low gas permeation through the protective layer also at high temperatures.

In particular in view of a very low gas permeation through the protective layer, the polymeric material of the protective layer, in particular the epoxy resin, has a crosslinking density in the range from 50% to 100%. In this context, the crosslinking density relates to the proportion of functionality reacting to form a cross-link. In the case of the polymeric material being an epoxy resin, 50% to 100% of the epoxy groups thus react to form a cross-link.

Alternatively or additionally, the gas permeation can be decreased by the protective layer being applied indirectly on the basic body and arranging between the basic body and the protective layer a reinforcement layer, according to a further preferred embodiment. In this regard, it is particularly preferred that the reinforcement layer comprises or consists of a polyester.

Further to the above described apparatus and solid component, the invention also relates to a method for preventing reaction of at least one solid component of an electrical apparatus for the generation, transmission, distribution and/or usage of electrical energy, said apparatus comprising a housing enclosing an insulating space and an electrically conductive part arranged in the insulating space, said insulating space containing a dielectric insulation fluid comprising an organofluorine compound, at least one solid component of the apparatus being directly exposed to the insulation fluid.

The method comprises the steps of
a) providing a basic body of the at least one solid component, said basic body being made of a first material and
b) applying onto the surface of the basic body a protective layer made of a second material,
wherein the reactivity of the second material towards the organofluorine compound is lower than the reactivity of the first material towards the organofluorine compound at operational conditions of the apparatus.

In particular, the material of the protective layer is at least approximately inert towards the insulation fluid at operational conditions of the apparatus.

The preferred features described above for the apparatus and the solid component of the present invention likewise are herewith disclosed for the method and vice versa.

Still further, the present invention also relates to the use of a polymeric material, in particular in an apparatus as disclosed herein, the polymeric material being selected from the group consisting of: epoxy resins, polyolefins, particularly hydrogenated polyolefins or fluorinated polyolefins and more particularly polytetrafluoroethylene, polyurethanes, and mixtures thereof for a protective layer to prevent reaction between an organofluorine compound and a solid component reactive towards the organofluorine compound.

Throughout this whole disclosure, the term "protective layer" as used in the context of the present invention encompasses any coating, e.g. dielectric coating or semiconducting coating or slightly conductive coating or metallic coating or multi-layer coating, e.g. containing a combination of such coating layers, applicable on the basic body, in particular in form of a lacquer and/or painting, e.g. dielectric lacquer and/or dielectric painting. Thus, the protective layer 10 is made of dielectric material or semiconductive material or slightly conducting material or metallic material, or forms a multi-layer containing a combination of such materials.

According to a second aspect of the present invention, the protective layer protects the apparatus from dielectric breakdown. According to this aspect, the invention also relates to a method for enhancing the dielectric performance of an electrical apparatus for the generation, transmission, distribution and/or usage of electrical energy, said apparatus comprising a housing enclosing an insulating space and an electrically conductive part arranged in the insulating space, said insulating space containing a dielectric insulation fluid comprising an organofluorine compound, at least one solid component of the apparatus being directly exposed to the insulation fluid, the method comprising the step of
A) providing a basic body of the at least one solid component,
B) and applying on the surface of the basic body a coating, wherein the surface of the coating applied in step B) is smoother than the surface of the basic body of step A).

It has been found that the coating enhances the dielectric performance (dielectric breakdown limit) of the electrical apparatus, particularly a switching apparatus, more particularly an interrupter. If the coating is applied to the basic body of a solid component arranged in the switching apparatus, the surface of the basic body becomes smoother. Thus, the sensitivity against particles is reduced.

This effect can be explained by the fact that partial discharge events are triggered by the presence of particles. The requirement for partial discharge to occur is that the local electric field enhancement, due to the dimensions of the particle, exceeds the inception voltage of the insulating gas. The same is valid for rough surfaces that have microscopic protrusions: the local field enhancement at these protrusions can initiate partial discharge events. This is efficiently avoided by the smoothening of the surface of the basic body according to the method of the present invention. Thus, the conductive parts can be subject to electric fields exceeding the breakdown field of the uncoated insulation system without failing dielectrically. In other words, the breakdown limit for the coated contacts is increased.

In particular with regard to this second aspect, the protective layer is preferably a lacquer. In this regard, a powder lacquer, in particular a powder lacquer on an epoxy resin base, such as "RELEST® Powder EP Protect grey/grau S/M", or a water based lacquer, in particular a water based lacquer on an epoxy resin base, such as "SEEVENAX-Schutzlack 312-55", can be used.

If a relatively thick coating, in particular of a thickness ranging from 1 mm to 10 mm is to be applied on the basic body, the material of the coating is preferably selected from the group consisting of polytetrafluoroethylene, polyimide, polyethylene, polypropylene, polystyrene, polycarbonate, polymethyl methacrylate, polysulfone, polyetherimide, polyether ether ketone, parylene N™, Nuflon™, silicone, epoxy resins, as well as combinations thereof.

If a relatively thin coating, in particular of a thickness ranging from 60 μm (micrometer) to 100 μm (micrometer) is to be applied on the basic body, the material of the coating is preferably selected from the group consisting of: polytetrafluoroethylene, polyimide, polyethylene, polypropylene, polystyrene, parylene N™ (i.e. aromatic hydrocarbon polymers), Nuflon™ (i.e. fluorinated polymers), polyamide, an ethylene-monochlorotrifluoroethylene copolymer, more particularly HALAR™ and HALAR™ C, as well as combinations thereof.

BRIEF DESCRIPTION OF THE DRAWINGS

The present invention is further illustrated by way of the attached figures, of which
FIG. 1 relates to a schematic illustration of a surface-near region of a solid component according to the present invention in cross-section.

DESCRIPTION OF THE PREFERRED EMBODIMENTS

Figure 1:
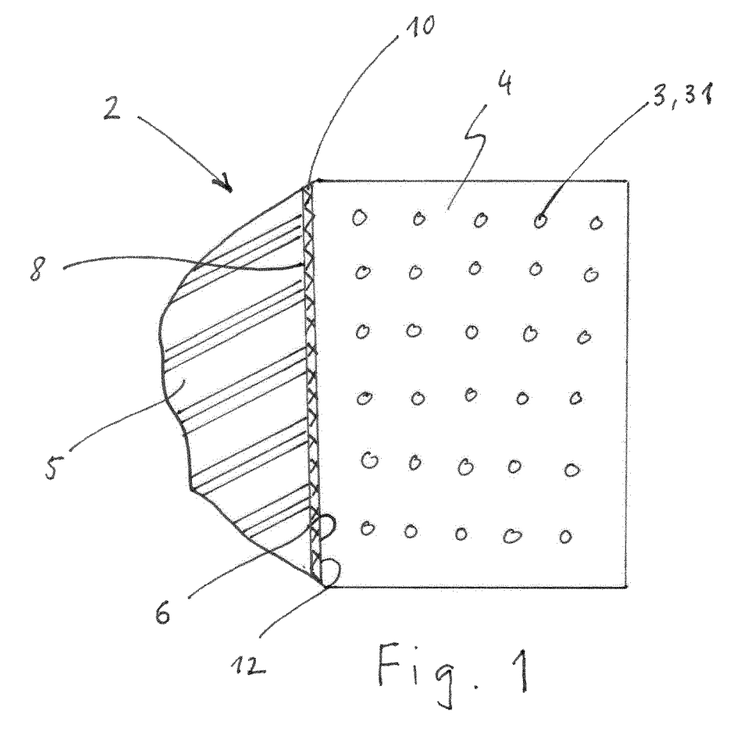

In the apparatus or electrical apparatus according to the present invention, the solid component 2 shown in FIG. 1 is arranged in a manner that it is directly exposed to the insulation fluid 3 contained in the insulation space 4 of the apparatus. In the embodiment shown, the insulation fluid 3 is for example an insulation gas 31. It may also be a liquid.

The solid component 2 contains a basic body 5 made of a first material. In particular, this material can be any material well-established e.g. for use in an $SF_6$-insulated apparatus, such as polyamides. In the specific case shown in FIG. 1, the first material is an insulator.

In the embodiment shown, the solid component 2 has a first side 6 exposed to the insulation fluid and a second side (not shown) remote from the first side and not being exposed to the insulation fluid 31.

On the side 8 of the basic body 5 facing the first side 6 of the solid component 2, a protective layer 10 is applied which is made of a second material different from the first material. Thus, on the side remote from the basic body 5 the surface of the protective layer 10 is directly exposed to the insulation fluid.

In the embodiment shown, the protective 10 layer is applied directly on the basic body 5, meaning that there is no intermediate layer formed between the basic body 5 and the protective layer 10. However, it is also thinkable to provide an intermediate layer, such as an adhesion promoter and/or primer, between the basic body 5 and the protective layer 10. In this case, the protective layer is applied indirectly on the basic body 5.

The second material comprises or consists of a polymeric material selected from the group consisting of: epoxy resins, polyolefins, particularly hydrogenated polyolefins or fluorinated polyolefins and more particularly polytetrafluoroethylene, polyurethanes, and mixtures thereof.

In embodiments, the protective layer 10 is made of dielectric material. In further embodiments, the protective layer 10 is a coating, a lacquer, a painting, or a combination thereof applied on the basic body 5.

By preventing the basic body 5 from coming into direct contact with the insulation fluid, the protective layer 10 shields the first material from reaction with the organofluorine compound or any other component of the insulation fluid, such as degradation products of the organofluorine compound. The integrity of both the insulation fluid as well as of the solid component can thus be ensured.

Figure 2:
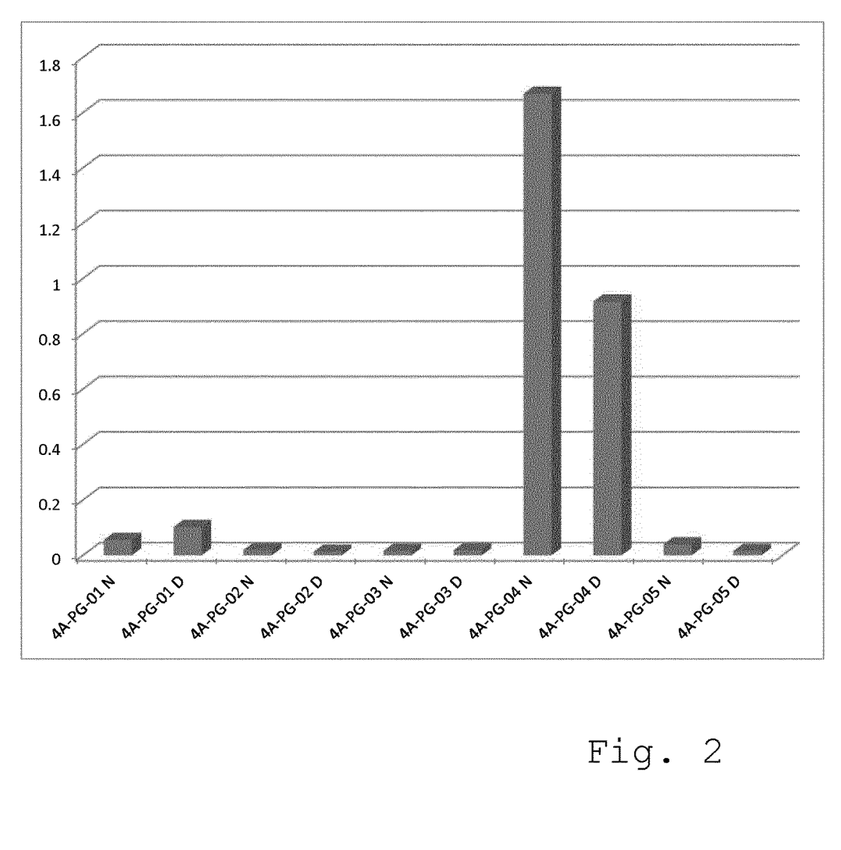
FIG. 2 relates to the volume concentration of the decomposition product heptafluoropropane in an insulation fluid comprising an organofluorine compound after having subjected the insulation fluid to various solid components in humid or dry conditions for one month at 100° C.
Figure 3:
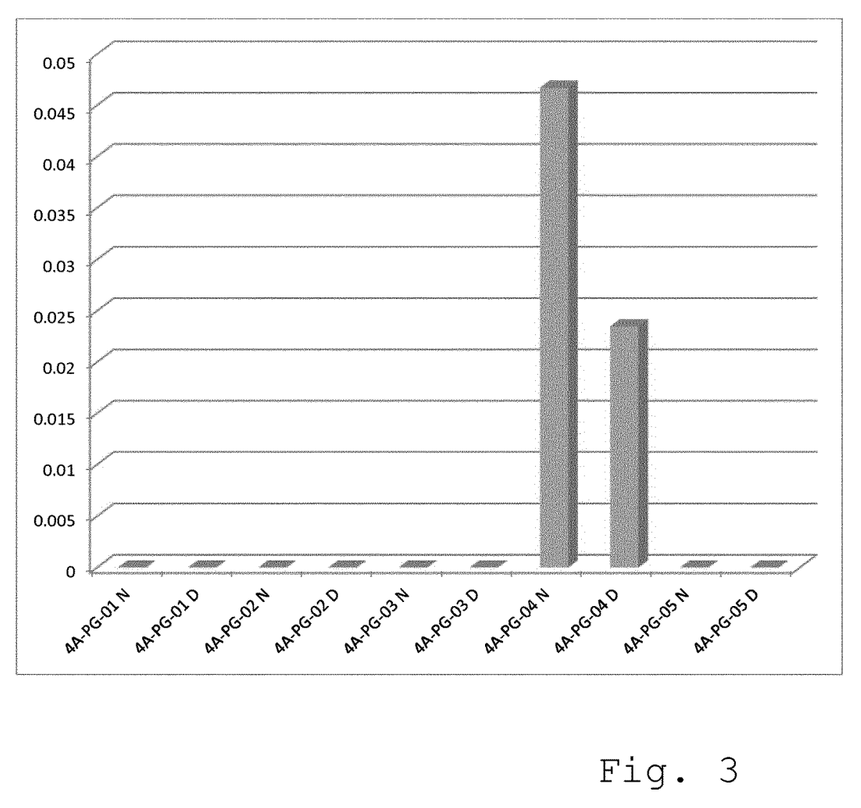
FIG. 3 relates to the volume concentration of the decomposition product hexafluoropropene in an insulation fluid comprising an organofluorine compound after having subjected the insulation fluid to various solid components in humid or dry conditions for one month at 100° C.

Among the different polymeric materials mentioned above, epoxy resins are highly preferred, as shown in FIGS. 2 and 3. According to FIGS. 2 and 3, exposure of the different epoxy resin grades to an organofluorine-compound-containing insulation fluid resulted in most cases in almost no generation of decomposition products heptafluoropropane and hexafluoropropene, respectively. In the specific case, C5K in combination with a mixture of technical air (80% $N_2$ and 20% $CO_2$) as a carrier gas was used, whereby the ratio of the C5K to the carrier gas varied with the temperature of application and was chosen such to have a maximum partial pressure of C5K, but avoiding condensation in the apparatus.

Heptafluoropropane and hexafluoropropene are the major decomposition products of the organofluorine compound used and can therefore be used as indicators for the compatibility of the material of the solid component with the insulation fluid. The highest concentrations for both of these decomposition products have been determined for epoxy resin grade 4A-PG-04 N and 4A-PG-04 D. However, the concentration determined for this grade is still far lower than what is determined for conventional sealings and thermoplastics (both containing basic fillers and additives, such as MgO, CaO, NaO, amines and phenols) developed for use in an $SF_6$-insulated apparatus: whereas—after exposure to an organofluorine compound-containing insulation fluid—these sealings and thermoplastics generate heptafluoropropane in a concentration of more than 4%, the concentration generated by epoxy resin grade 4A-PG-04 is only about 1.8%.

As mentioned above, the protective layer according to the present invention has a thickness of at least 50 μm. It has been found that by a protective layer of this thickness, gas permeation, in particular of the organofluorine compound, is negligible. Thus, the protective layer prevents the organofluorine compound from permeating to the first material which is potentially reactive towards the organofluorine compound. This has important consequences not only for the dielectric insulation fluid which retains is functionality over a prolonged period, given that the organofluorine compound is not subject to degradation reactions. Also, the solid component or its basic body, which is or are made of a dielectric insulating material, retains its insulation function over a prolonged period, since it is not chemically attacked by the dielectric insulation fluid.

For example, the typically observed problem of polyamide components becoming extremely brittle when exposed to fluoroketone, which itself undergoes degradation by this exposure, can be circumvented. In comparison to unprotected polyamide components, solid polyamide components according to the present invention being covered with a protective layer do not easily break upon mechanical stress and the dielectric properties of the insulation fluid are maintained over a prolonged period.

The same applies to a solid component or its basic body comprising or consisting of polyamide or a polyamide composite, to a solid component or its basic body containing alkaline or alkaline earth cations, e.g. to a fiber reinforced composite and/or to an elastomer, e.g. containing MgO or CaO as a filler, since without the protective layer of the present invention, these materials tend all to nucleophilic substitution of e.g. the ketone moiety of the fluoroketone or the nitrile moiety of the fluoronitrile.

As also mentioned above, the reactivity of the second material towards the organofluorine compound is lower than the reactivity of the first material towards the organofluorine compound at operational conditions of the apparatus. Specifically, the term "reactivity" as used in the context of the present invention relates to the ability or tendency of the material to attack the organofluorine compound or any degradation product at operational conditions, in particular its functional group, more specifically the ketone moiety in the case of the organofluorine compound being or comprising a fluoroketone or the nitrile moiety in the case of the organofluorine compound being or comprising a fluoronitrile. In accordance, the term "inert" or "inertness" relates to an inexistent or negligible tendency of the material to chemically attack the organofluorine compound or any degradation product thereof at operational conditions.

In the specific case that the material of the protective layer is at least approximately inert towards the insulation fluid at operational conditions of the apparatus, the protective layer has a dual function, firstly to withdraw reactive groups from the surface of the solid component or its basic body, that is directly exposed to the insulation fluid, and secondly to prevent reaction of the organofluorine compound with the first material which would be possible to occur in case the organofluorine compound would permeate through the layer.

For example, a suitable protective layer is a cured epoxy system comprising a multifunctional epoxy resin, a hardener and an accelerator. In even more specific terms, a cured epoxy system comprising Araldite® CY179 (as multifunctional epoxy resin), Aradur® 917 (as hardener) and Accelerator DY 070 can be used (all available from Huntsman).

As also mentioned above, the first material, i.e. the material of the solid component or basic body of the at least one solid component, comprises or consists of a material selected from the group consisting of: a polymeric material, a ceramic, a composite material, in particular an insulating composite material, and mixtures or combinations thereof. In other words, the first material is a dielectric insulating material. The present invention is therefore in clear distinction from the teaching of WO 2014/037566 according to which a solid dielectric layer is applied on electrical conductors or electrodes. Accordingly, also the technical problem which the teaching WO 2014/037566 attempts to solve is completely different, namely to provide a hybrid dielectric insulation.

As further mentioned above, the polymeric material of the protective layer, in particular the epoxy resin, has a glass transition temperature (Tg) higher than 100° C. However, in case the solid component is a sealing, a material having a lower Tg can be preferred, since for the sealing a flexible material of a relatively low Tg is generally preferred.

According to embodiments of the present invention, the second material has a density higher than 120 kg/m$^3$, preferably higher than 150 kg/m$^3$, more preferably higher than 170 kg/m$^3$, and most preferably higher than 220 kg/m$^3$. According to this embodiment, the density is thus higher than e.g. the one of an insulating foam to be used in a cable, particularly of the low loss foam disclosed in WO 2004/094526. In fact, in attempting to prevent reaction of the organofluorine compound contained in the dielectric insulation fluid and, to this end, also to provide a low gas permeation to the first material of the basic body, the protective layer according to the present invention is not only in its density but also in its function in clear distinction from the foam of WO 2004/094526, which in addition is not exposed to an organofluorine compound-containing insulation fluid.

Further, the protective layer of the present invention is in clear distinction from any self-supporting component that is not applied on a basic body, such as the cover according to WO 2014/037395, protecting the cavity of a gas-open measurement cell from particle contamination.

Throughout this application, all embodiments and hence claims disclosed for the apparatus are applicable, as well, to the solid component of the apparatus, and vice versa. Furthermore, all embodiments of the methods or use also apply to the apparatus and solid component, and vice versa.

LIST OF REFERENCE NUMERALS 2 solid component
3; 31 insulation fluid; insulation gas
4 insulation space
5 basic body
6 first side of the solid component exposed to the insulation fluid
8 side of the basic body facing the first side of the solid component
10 protective layer; coating
12 side of the protective layer remote from the basic body

The invention claimed is:

1. An apparatus for the generation, transmission, distribution and/or usage of electrical energy, the apparatus comprising:
a housing enclosing an insulating space and an electrically conductive part arranged in the insulating space, the insulating space containing a dielectric insulation fluid comprising an organofluorine compound, at least one solid component of the apparatus being directly exposed to the insulation fluid, wherein the at least one solid component that is directly exposed to the insulation fluid contains a basic body made of a first material and a protective layer made of a second material different from the first material, a first side of the protective layer being directly or indirectly applied on the basic body, the protective layer having a thickness of at least 50 μm,
wherein the organofluorine compound is selected from the group consisting of: fluoroethers, fluoroketones, fluoroolefins, fluoronitriles, and mixtures thereof, and
wherein the first material is an insulating material and consists of a material selected from the group consisting of: a polymeric material, a ceramic, a composite material, and mixtures or combinations thereof;
wherein the second material comprises a polymeric material;
wherein at operational conditions of the apparatus the reactivity of the second material towards the organofluorine compound is lower than the reactivity of the first material towards the organofluorine compound; and
wherein the surface of the protective layer is smoother than the surface of the basic body.

2. The apparatus according to claim 1, wherein the second material is made of dielectric material.

3. The apparatus according to claim 1, wherein the protective layer has a thickness of at least 100 μm.

4. The apparatus according to claim 1, wherein the protective layer has a thickness in the range 50 μm to 100 μm.

5. The apparatus according to claim 1, wherein the polymeric material of the protective layer has a glass transition temperature higher than 100° C.

6. The apparatus according to claim 1, wherein the polymeric material of the protective layer has a crosslinking density in the range from 50% to 100%.

7. The apparatus according to claim 1, wherein the protective layer is applied indirectly onto the basic body, and between the basic body and the protective layer a reinforcement layer is arranged.

8. The apparatus according to claim 1, wherein the protective layer is a lacquer.

9. The apparatus according to claim 1, wherein the solid component has a first side oriented towards the insulation fluid and a second side remote from the first side and not being oriented towards the insulation fluid, the protective layer being applied on the side of the basic body facing the first side of the solid component.

10. The apparatus according to claim 1, wherein on a second side of the protective layer disposed remote from the basic body a surface of the protective layer is directly exposed to the insulation fluid.

11. The apparatus according to claim 1, wherein the second material has no reactivity towards the organofluorine compound or any degradation product thereof at operational conditions of the apparatus; and/or the protective layer is for protecting the basic body from reacting with the insulation fluid.

12. The apparatus according to claim 1, wherein the protective layer is a coating, a lacquer, a painting, or a combination thereof applied on the basic body, and the protective layer forms a non-self-supporting structure.

13. The apparatus according to claim 1, wherein the protective layer is made of dielectric material or sem iconductive material or slightly conducting material or metallic material, or forms a multi-layer coating containing a combination of such materials.

14. The apparatus according to claim 1, wherein the organofluorine compound is selected from the group consisting of: hydrofluoroethers, in particular hydrofluoromonoethers, perfluoroethers, perfluoroketones, hydrofluoroolefins, perfluoronitriles, and mixtures thereof.

15. The apparatus according to claim 1, wherein the insulation fluid comprises a fluoroketone containing from four to twelve carbon atoms.

16. The apparatus according to claim 1, wherein the insulation fluid comprises a hydrofluoromonoether containing at least three carbon atoms.

17. The apparatus according to claim 1, wherein the insulation fluid comprises air or at least one air component selected from the group consisting of: oxygen ($O_2$), nitrogen ($N_2$), carbon dioxide ($CO_2$), and mixtures thereof.

18. The apparatus according to claim 1, wherein the insulation fluid comprises carbon dioxide ($CO_2$) in a mixture with oxygen.

19. The apparatus according to claim 18, wherein the insulation fluid comprises carbon dioxide and oxygen and the ratio of the amount of carbon dioxide to the amount of oxygen ranges from 50:50 to 100:1.

20. The apparatus according to claim 1, wherein the apparatus is part of or is a: high voltage apparatus, medium voltage apparatus, low voltage apparatus, direct-current apparatus, switchgear, air-insulated switchgear, part or component of air-insulated switchgear, gas-insulated metal-encapsulated switchgear (GIS), part or component of gas-insulated metal-encapsulated switchgear, gas-insulated transmission line (GIL), busbar, bushing, gas-insulated cable, cable joint, current transformer, voltage transformer, sensors, humidity sensors, surge arrester, capacitor, inductance, resistor, current limiter, high voltage switch, earthing switch, disconnector, combined disconnector and earthing switch, load-break switch, circuit breaker, gas circuit breaker, gas-insulated vacuum circuit breaker, generator circuit breaker, medium voltage switch, ring main unit, recloser, sectionalizer, low voltage switch, any type of gas-insulated switch, transformer, distribution transformer, power transformer, tap changer, transformer bushing, electrical rotating machine, generator, motor, drive, semiconducting device, power semiconductor device, power converter, converter station, convertor building; and components and/or combinations of such devices.

21. The apparatus according to claim 1, wherein the solid component or its basic body is or are a solid insulator or post insulator or compartment insulator or GIS insulator arranged or for being arranged in a medium-voltage GIS or high-voltage GIS, or is a GIL insulator or transformer insulator for a gas-insulated transformer or a solid insulation in a gas-insulated cable, wherein the protective layer is made of a dielectric material or semiconductive material or slightly conducting material, or forms a multi-layer containing a combination of such materials.

22. The apparatus according to claim 1, wherein the solid component or its basic body is or are a sealing component, wherein the protective layer is made of a semiconductive material or slightly conducting material or metallic material, or forms a multi-layer containing a combination of such materials.

23. The apparatus according to claim 1, wherein the second material is selected from the group consisting of: epoxy resins, polyurethanes and mixtures thereof.

24. The apparatus according to claim 1, wherein the second material is selected from the group consisting of: polyimide, polypropylene, polystyrene, polycarbonate, polymethyl methacrylate, polysulfone, polyetherimide, polyether ether ketone, aromatic hydrocarbon polymers, fluorinated polymers, silicone, as well as combinations thereof, when the protective layer has a thickness ranging from 1 mm to 10 mm.

25. The apparatus according to claim 1, wherein the second material is selected from the group consisting of: polyimide, polypropylene, polystyrene, aromatic hydrocarbon polymers, fluorinated polymers, polyamide, an ethylene-monochlorotrifluoroethylene copolymer, as well as combinations thereof, when the protective layer has a thickness ranging from 60 µm to 100 µm.

26. The apparatus according to claim 1, wherein a density of the second material is greater than 120 kg/m$^3$.

27. A method for preventing reaction of at least one solid component of an apparatus for the generation, transmission, distribution and/or usage of electrical energy, the apparatus comprising a housing enclosing an insulating space and an electrically conductive part arranged in the insulating space, the insulating space containing a dielectric insulation fluid comprising an organofluorine compound, at least one solid component of the apparatus being directly exposed to the insulation fluid, the method comprising the steps of:
  a) providing a basic body of the at least one solid component, the basic body being made of a first material, and
  b) applying onto the surface of the basic body a protective layer made of a second material,
  wherein at operational conditions of the apparatus the reactivity of the second material towards the organofluorine compound is lower than the reactivity of the first material towards the organofluorine compound; and
  wherein the surface of the protective layer is smoother than the surface of the basic body.

28. The method according to claim 27, wherein the material of the protective layer has no reactivity towards the insulation fluid at operational conditions of the apparatus.

29. A method for enhancing the dielectric performance of an electrical apparatus for the generation, transmission, distribution and/or usage of electrical energy, the apparatus comprising a housing enclosing an insulating space and an electrically conductive part arranged in the insulating space, the insulating space containing a dielectric insulation fluid comprising an organofluorine compound, with at least one solid component of the apparatus being directly exposed to the insulation fluid, the method comprising the steps of:
  a) providing a basic body of the at least one solid component, the basic body being made of a first material, and
  b) applying onto the surface of the basic body a coating made of a second material,
  wherein the surface of the coating is smoother than the surface of the basic body, and
  wherein at operational conditions of the apparatus the reactivity of the second material towards the organofluorine compound is lower than the reactivity of the first material towards the organofluorine compound.

* * * * *